(12) United States Patent
Jayaraman et al.

(10) Patent No.: US 9,374,848 B1
(45) Date of Patent: Jun. 21, 2016

(54) METHOD AND DEVICE FOR IMPROVING LAWFUL INTERCEPTION OF A CALL

(71) Applicants: Venkata Subramanian Jayaraman, Chennai (IN); Swaminathan Seetharaman, Chennai (IN); Kumar Ramadoss, Chennai (IN)

(72) Inventors: Venkata Subramanian Jayaraman, Chennai (IN); Swaminathan Seetharaman, Chennai (IN); Kumar Ramadoss, Chennai (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/748,088

(22) Filed: Jun. 23, 2015

(30) Foreign Application Priority Data

Mar. 16, 2015 (IN) .......................... 1301/CHE/2015

(51) Int. Cl.
*H04W 76/06* (2009.01)
(52) U.S. Cl.
CPC ........ *H04W 76/064* (2013.01); *H04M 2207/18* (2013.01)
(58) Field of Classification Search
CPC . H04L 12/1822; H04L 43/0811; H04L 45/22; H04L 51/14; H04L 65/1083; H04L 67/145; H04W 4/22; H04W 12/08; H04W 76/02; H04W 76/025; H04W 76/027; H04W 76/064; H04W 88/02; H04M 1/24; H04M 1/274

USPC ....................................................... 455/414.1
See application file for complete search history.

(56) References Cited

U.S. PATENT DOCUMENTS

| 7,496,185 B1 | 2/2009 | Primavesi et al. |
| 8,165,563 B2 | 4/2012 | Doherty |
| 2010/0199189 A1* | 8/2010 | Ben-Aroya ....... G06F 17/30516 715/736 |
| 2011/0021735 A1 | 1/2011 | Liu et al. |
| 2011/0136553 A1 | 6/2011 | Jo |
| 2012/0311196 A1 | 12/2012 | Akimoto et al. |

FOREIGN PATENT DOCUMENTS

WO   WO99628948 A1   9/1996

* cited by examiner

*Primary Examiner* — Kwasi Karikari
(74) *Attorney, Agent, or Firm* — Finnegan, Henderson, Farabow, Garrett & Dunner, L.L.P.

(57) ABSTRACT

Embodiments of the present disclosure disclose a method and a device for improving lawful interception of a call is provided. The method comprises monitoring a telecommunication call of a lawful interception target subscriber. Then, the method comprises detecting a call-release trigger associated with the telecommunication call. Further, the method comprises initiating a media plane audit of the telecommunication call to determine whether the call-release trigger is a false release trigger. The media plane audit determines whether media plane resources for the telecommunication call is released in response to the call-release trigger. Additionally, the method includes performing at least one call handling action in response to determining a false release trigger.

21 Claims, 4 Drawing Sheets

METHOD AND DEVICE FOR IMPROVING LAWFUL INTERCEPTION OF A CALL

PRIORITY CLAIM

This U.S. patent application claims priority under 35 U.S.C. §119 to: India Application No. 1301/CHE/2015, filed Mar. 16, 2015. The entire content of the aforementioned application is incorporated herein by reference.

TECHNICAL FIELD

The present subject matter is related, in general to call interception techniques and more particularly, but not exclusively to systems and methods for improved lawful interceptions for calls.

BACKGROUND

Currently, digital communication has revolutionized telephone networks. There are legal organizations for monitoring telephonic communications wherever there is a chance of suspect of any terror or for any other illegal operations. A Lawful interception (LI) is the legally sanctioned official access to private communications, such as telephone calls or e-mail messages. In general, LI is a security process in which a network operator or service provider gives law enforcement officials access to the communications of private individuals or organizations.

In the discipline of Lawful Interception, it is important to distinguish and know between Network Access and Network Services since the two are somewhat different by convention. Network Access is typically managed by the Network Access Provider (AP), who's infrastructure often (but now always) relies on that of the Network Operator (NWO), such as the incumbent telecom operator, local cable TV service, or wireless services operator. Network Services mentioned here are be E-mail, chat, WIFI etc. In the context of lawful interception, Lawful enforcement Agencies (LEA) often must interact with both Network Access and Network Services to intercept target data. The target meant here was the intercepted person.

Conventional methods of LEA interception and monitoring of call by suspect (LI target) comprises typical interception and monitoring of call by a LEA. The method comprises LEA interface (LEAI) activates interception for a subscriber (LI target). This activates interception for all calls involving the LI target until the LI is deactivated by the LEAI. Next, call initiation and interception method in which a call involving the LI target is initiated with the LI target being the calling or the called user in the call. While setting up the call involving the LI target subscriber, the Media gate controller (MGC)/Softswitch initiates interception of the call. The MGC passes signaling information, and initiates transfer of media information from the MGW to LEA Interface (via LIG). The LEA monitors current state of the call using information received. Next, performing Dual Tone Multi-Frequency (DTMF) reporting and false release trigger, in which the calling or the called user may perform some DTMF activity to trigger a false call release event. The DTMF activity is captured by the Media Gateway (MGW) and reported to the Anti-Fraud Control System Interface in the MGC through Media Gateway Interface. The MGC reports the DTMF activity to the Anti-Fraud Control system (or sub-system). Also, the MGC receives a (false) release trigger due to the DTMF activity by calling or called user. Thereafter, call and interception termination is performed by the MGC. The MGC performs the call termination based on the (false) release trigger received to release all the resources for the call on the signaling plane. The MGC performs call interception termination based on this (false) release trigger. The MGC informs LEA through LEA interface that the call is released (over HI2 signaling interface as CC Close message), and the media information transmission through LEAI is stopped.

In this method, it is clear that the media path between the calling and called user is still active even after the call-release in the signaling plane, since the release trigger was a false one intended to terminate the connection on the signaling plane only, while the two users involved in the call will continue their conversation. Since the MGC/Soft switch terminates the interception of the call based on the false release trigger, the LI target subscriber can continue communication without being monitored by the LEA as the MGW stops sending media information to the LEA through LEAI.

Available mechanism fails to ensure that the target interception continues with LEA till the actual call disconnection happens in the network. The key limitation are determination of actual call status in case of a potentially fraudulent call and taking action on the call based on preference of LEA in order for uninterrupted tracking of the LI target.

There exists a need to have a mechanism to identify actual status of a potentially fraudulent call on real-time basis and take appropriate measures for uninterrupted tracking of the LI target by LEA.

SUMMARY

Disclosed herein is a method and device for improving the interception mechanism. The method comprises monitoring a telecommunication call of a lawful interception target subscriber, to detect a call-release trigger associated with the telecommunication call, initiate a media plane audit to determine whether the call-release trigger is a false release trigger and perform call handling action in response to determining a false release trigger.

In an embodiment of the present disclosure, a lawful interception device is provided. The lawful interception device comprises a memory and a processor coupled to the memory. The memory stores processor executable instructions, which when executed by the processor causes the processor to monitor a telecommunication call of a lawful interception target subscriber, detect a call-release trigger associated with the telecommunication call, initiate a media plane audit of the telecommunication call to determine whether the call-release trigger is a false release trigger and perform at least one call handling action in response to determining a false release trigger. The media plane audit determines whether media plane resources for the telecommunication call is released in response to the call-release trigger.

In an aspect of the present disclosure, a method for improving lawful interception of a call is provided. The method comprises monitoring a telecommunication call of a lawful interception target subscriber. Then, the method comprises detecting a call-release trigger associated with the telecommunication call. Further, the method comprises initiating a media plane audit of the telecommunication call to determine whether the call-release trigger is a false release trigger. The media plane audit determines whether media plane resources for the telecommunication call is released in response to the call-release trigger. Additionally, the method includes performing at least one call handling action in response to determining a false release trigger.

In another aspect of the present disclosure, a non-transitory computer readable medium is disclosed. The non-transitory computer readable medium includes instructions stored thereon that when processed by a processor causes a device to perform operations comprising monitoring a telecommunication call of a lawful interception target subscriber. The operations also comprise detecting a call-release trigger associated with the telecommunication call. The operations further comprise initiating a media plane audit of the telecommunication call to determine whether the call-release trigger is a false release trigger, wherein the media plane audit determines whether media plane resources for the telecommunication call is released in response to the call-release trigger. Additionally, the operation may include performing at least one call handling action in response to determining a false release trigger.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

DETAILED DESCRIPTION

Figure 1:
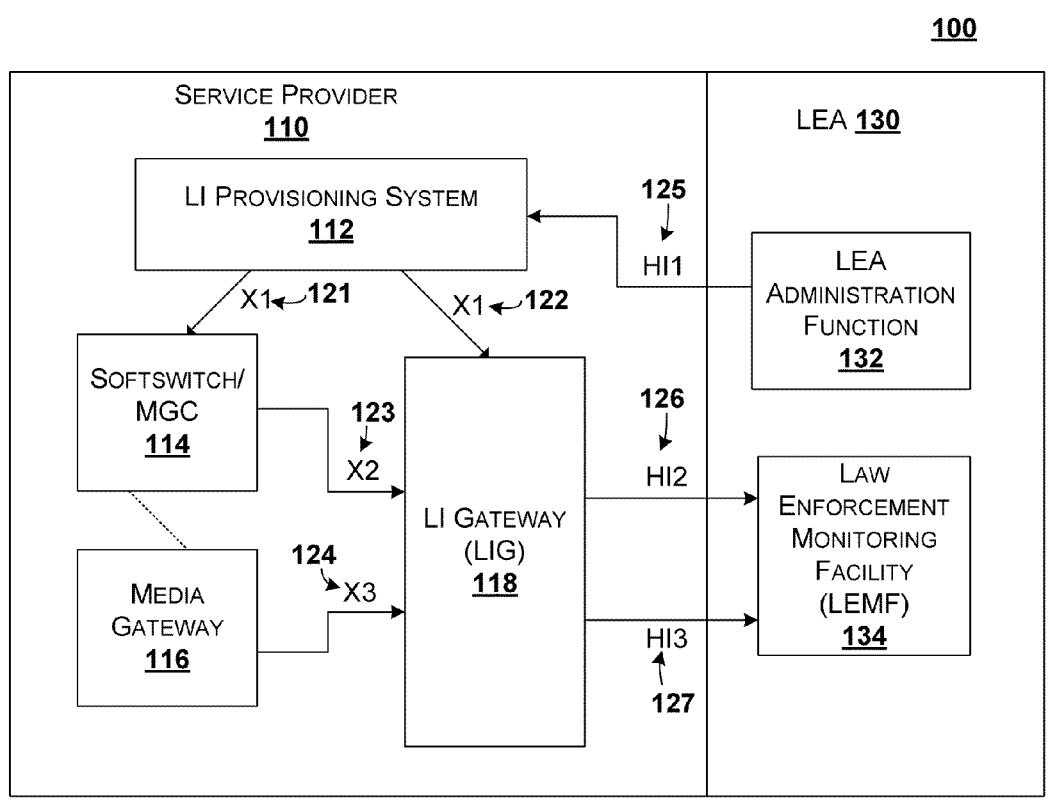
FIG. 1 illustrates a block diagram of an exemplary system for improved lawful interceptions for calls in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

Embodiments of the present disclosure are related to a method and device for improving lawful interception of a call.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

A law enforcement agency (LEA) may provide a request and/or authorization for a lawful interception (LI) of calls involving a target user. A LEA may be a government organization. Example LEAs include local, state, national, and international agencies that may monitor and track criminal activities or protect national interests. An LEA LI may require approval from another entity. For example, a city police department may need approval from the judiciary (e.g., a judge) in order to approve an LI. In other embodiments, an LEA may include a quasi-governmental entity or a private investigator.

Illustrative embodiments of the present disclosure are listed below. In one embodiment, improved call interception systems/devices are described. In another embodiment, call interception processes using improved interception systems/devices is described. In an embodiment, a computer system is disclosed which may carry out disclosed processes. The disclosed systems and processes may be used in conjunction or applied separately without limitation.

FIG. 1 illustrates an exemplary system for improved lawful interceptions for calls according to some embodiments of the present disclosure. System 100 may include service provider 110 and LEA 130.

In an embodiment, LEA 130 may include LEA administrator 134. LEA administrator may be a computerized interface to receive user input. In other embodiments, LEA administrator 132 may be an automated server, such as a networked hardware server, which may process call intercept requests without human intervention.

The LEA administrator 132 may provide call intercept information to service provider 110. In an embodiment, LEA administrator 132 may provide an LI action to LI provisioning system 112 using HI1 interface 125. For example, LEA administrator may transmit an identifier of a target identifier, such as a telephone number or IP address. LEA administrator may further indicate additional details for the LI action. For example, the LI action may indicate expiration for the LI action, multiple target identifiers, preferred monitoring data (e.g., particular formats for LI information), types of channels to monitor, and whether to use in-band DTMF analysis. These details may allow LEA 130 to specify LI actions that comply with local and national laws regarding surveillance and call monitoring.

In an embodiment, LEA 130 may include LEA enforcement monitoring facility (LEMF) 134. The LEMF 134 may receive LI data from service provider 110. In an embodiment, LEMF 134 may receive information from LI gateway 118 using HI2 interface 126 or HI3 interface 127. For example, HI2 interface 126 may include call detail information, such as timing, numbers, and DTMF data. LEMF 134 may receive media content (e.g., voice, video, data, fax) from LI gateway 118 using HI3 interface 127. LEMF 134 may store and provide LI information to networks, device, and users of LEA 130. For example, LEMF 134 may receive requests from networked device for specific LI information. LEMF 134 may provide requested detail information or media content to the networked device.

While LEA administrator 132 and LEMF 134 are depicted as part of LEA 130, it is to be understood that LEA administrator 132 and LEMF 134 may not be physically located at a law enforcement agency. In some embodiments, LEA administrator 132 and LEMF 134 may be located at different secure sites, such as secured information facilities. In an embodiment, LEA administrator 132 and LEMF 134 may not be collocated. For example, LEA administrator 132 may be located at a different location than LEMF 134.

In an embodiment, service provider 110 may include LI provisioning system 112. LI provisioning system 112 may receive call intercept requests. For example, LI provisioning system may receive call intercept requests (e.g., "LI requests" or "LI actions") from LEA 130. In an embodiment, the call intercept requests may include an identifier corresponding to a target user. For example, the call intercept may include the IP address, telephone number, MAC address, or email address of a person whose calls should be intercepted. LI provisioning system 112 may transmit messages to improved MGC 114 and LI gateway 118 based on the call intercept requests. For example, LI provisioning system 112 may transmit the target user identifier, such as a telephone number, to improved MGC 114 over X1 interface 121 with an instruction to monitor in band signaling for the target user identifier. LI provisioning system 112 may also transmit information and instructions to LI gateway 118 over X1 interface 122.

In an embodiment, service provider 110 may include at least one media gateway (MGW) and media gateway controller (MGC). As depicted, service provider 110 includes improved MGC 114 and improved MGW 116. The improved MGC 114 and improved MGW 116 may provide standard gateway controller and gateway functionality, respectively. They may also perform DTMF detection. For example, improved MGW 116 may monitor the information being transferred in the media path, such as DTMF tones that occur during DTMF digit dialing.

Improved MGW 116 may send improved notifications to improved MGC 114. For example, improved MGW 116 may transmit improved notifications that include DTMF tones captured from in-band signaling.

In an embodiment, service provider 110 may include LI gateway 118. LI gateway may receive information from improved MGC 114 and improved MGW 116. For example, improved MGC 114 may provide call detail information over X2 interface 123, while improved MGW 116 may provide media content (e.g., voice, video, data, fax) over X3 interface 124.

The LI gateway 118 may perform transcoding processes. In an embodiment, LI gateway 118 may reformat data received from improved MGC 114 and improved MGW 116 prior to sending the data to LEMF 136. LI gateway 118 may transcode data to a particular format. For example, LI gateway 118 may convert captured audio from to a particular file format or compress video. In an embodiment, the LI action received from LEA administrator 134 may include specific formatting requirements for data. LI provisioning system 112 may transmit these requirements to LI gateway over X1 interface 122. The formatting requirements may specify, for example, file formats, bit rates, file size limits, resolution requirements, and image types.

Figure 2:
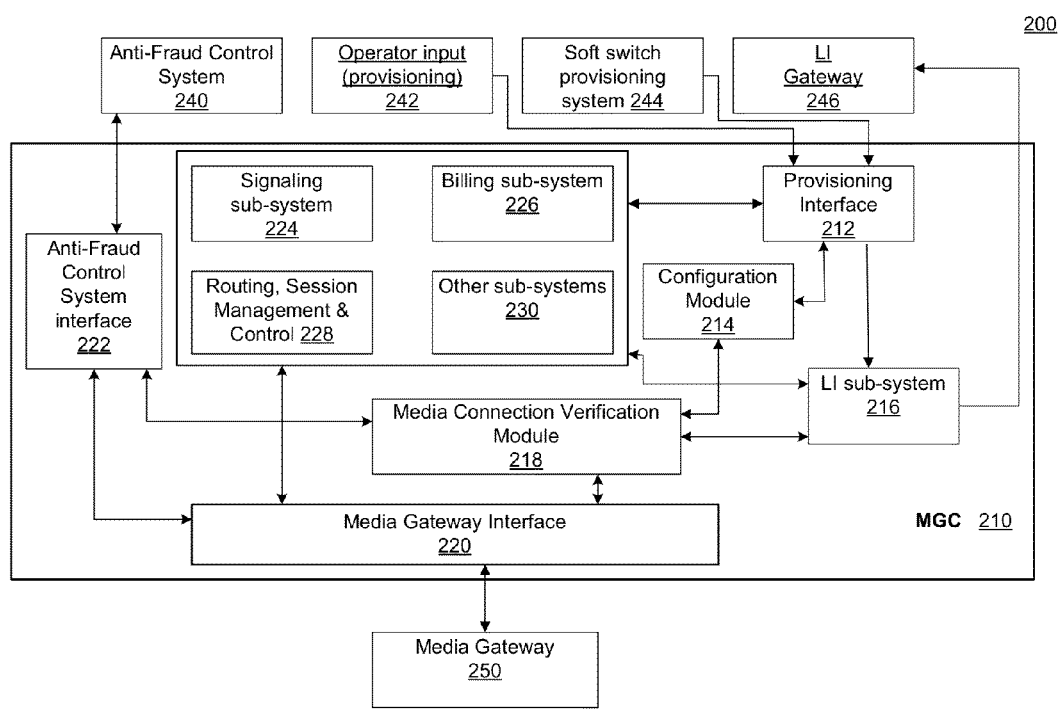
FIG. 2 is a functional block diagram of a system to improve lawful interception of a call according to some embodiments of the present disclosure.

FIG. 2 is a functional block diagram according to some embodiments of the present disclosure. System 200 may be implemented as part of system 100. The system 200 includes media gateway controller (MGC) or also referred as softswitch 210, media gateway (MGW) 250. The MGC 210 is modified from standard media gateway controllers to improve the lawful interception of a call.

In an embodiment, the MGC 210 may include various sub systems to perform the objects of this disclosure. As depicted, the MGC 210 may include provisioning interface 212, configuration module (CM) 214, LI sub system 216, media connection verification module (MCVM) 218, media gateway interface 220, anti-fraud control system 222, signaling sub system 224, billing sub system 226, routing, session management, & control (RSMC) 228, and other sub systems 230. Additional sub systems may be used to perform disclosed processes. These sub systems may be discrete units or combined into fewer separate sub systems. The sub systems may be made of discrete circuitry or processors, or programmable applications which run on hardware.

The provisioning interface 212 may interact with the external provisioning systems, such as element management systems (EMS) and network management systems (NMS). In an embodiment, provisioning interface 212 may communicate with operator input provisioning 242 and soft switch provisioning system 244. The provisioning interface 212 may make updates to copies of provisioned data in the MGC 210 and may pass information to the necessary sub-systems, so that the provisioned data may be used by different sub-systems. In an embodiment, the provisioning interface 212 may interact with LEA systems. The provisioning interface 212 may obtain input from a LI gateway using, for example, an LEA interface. The input may describe the specific actions to be taken by MGC 210 when a potential false trigger for LI initiation for a call. For example, the provisioning interface 212 may receive one of false release specification as provisioned and potential false trigger for LI initiation for a call via the LEA interface (LEAI), and passes the information to the CM 214.

The configuration module (CM) 214 may process inputs from the provisioning interface 212 that is the necessary information and register an action to be taken when a false release is triggered. The CM 214 processes the information such as, but not limited to system load, congestion level in the traffic route, that are available in the MGC 210. The CM is configured with a processing logic to determine a wait time after which a call which is falsely released is to be 'really' released on the media plane level. The wait time is determined based on at least one of predefined minimum time duration, predefined maximum time duration, load of one or more telecom interception devices, and congestion of network paths associated with the telecommunication call. For example, the predefined minimum time duration may be in the range of few seconds to several minutes. The predefined minimum time duration is provided by the LEA to increase the effectiveness of LI. The predefined maximum time duration, for example, may be in terms of several minutes and is provided by an operator to minimize revenue losses while complying with any rules or guidelines that may have been specified by the LEA.

The LI sub-system 216 may process LI actions from an LEA, such as LEA 130. In an embodiment, the LI sub system 216 may carry out all LI related actions in MGC 210. The LI sub-system 216 may interface with the LEA (e.g., via LI gateway 246). The LI sub system may provide signaling information for an LEA, for example, through LI gateway 246 over an X2 interface. The LI sub-system 216 may initiate media content duplication and transport to an LEA. In an embodiment, the LI sub-system 216 may receive input from the provisioning interface 212 and the MCVM 220. For example, the LI sub-system 216 upon receiving a trigger from the MCVM 220 to terminate the call interception may terminate the call interception over the LEA interface (LEAI). For the call termination, the LI sub-system performs at least one of sending a CC Close signal to the LEAI, releasing all resources related to LI, and triggering for termination of the media path towards LEAI.

In one embodiment, the LI sub-system 216 upon receiving information from the MCVM 218 register, the actual reason for termination of call interception which is when the fraudulent call is released, the LI sub-system 216 includes appropriate information in the CC Close register towards the LEAI.

The MCVM 218 may receive at least one of DTMF digits from the MGW 250, DTMF digits patterns, whether it was dialed by the user from which side the release trigger is received and historic data on trends of calls involving one of the users always involving DTMF digit exchange before a call release trigger. The MCVM 218 analyzes the received input to determine the possibility of a call involving a LI target user to be falsely released. For example, if the analysis outcome indicates that the release trigger may be a false one, then the MCVM 218 verifies whether the call is falsely released by initiating an audit to be performed by the MGW 250 on the media plane for the call, for which a false release trigger was received. In another example, if the analysis outcome of the MCVM 218 indicates that the media plane resources for the call are not released and two users involved in the call can still communicate, the MCVM 218 triggers the CM 214 to determine the next step of action.

In one embodiment, the MCVM 218 initiates a media plane audit (not shown in the figure) based on the outcome of the analysis of received inputs. If the present call is possibly a fraudulent call, then the MCVM 218 initiates the media plane audit towards the MGW 250 for the specific call with the potentially fraudulent release event. If the media plane audit reveals that the media resources are still not cleared i.e. the release trigger was a false one, and the users involved in the fraudulent call can still communicate with each other, then the MCVM 218 triggers the CM 214 to determine the next course of action. The CM 214 triggers the MCVM 218 to perform at least one call handling action in response to the false release trigger. The at least one call handling action comprises at least one of releasing the media plane resources, terminating telecommunication call interception, and continuing the telecommunication call.

In one embodiment, the CM 214 is configured with a processing logic, and which determines Wait_Time duration, which may be 0 or greater than 0. Based on the Wait_Time duration, the MCVM 218 decides on further course of action. The MCVM 218 sends relevant information to the LI subsystem 216 associated with real reason for the call release. The LI subsystem 216 passes the information to the LEA 130 through the LEAI.

The Media Gateway Interface (MGI) 220 may process DTMF information received from the MGW 250. The MGI 220 sends the processed information to the MCVM 218 and also to the Anti-Fraud Control System Interface (AFCSI) 222. The MGI 220 is responsible for handling the state machine and interactions with the MGW 250.

The AFCSI 222 is configured to interact with the Anti-Fraud Control System (AFCS) 240, and trigger necessary actions for anti-fraud within the MGC 210. The AFCSI 222 performs at least one of passing the DTMF signaling information to the AFCS 240, triggering a call disconnection or silence insertion in the call i.e. in the media path between the calling and called users based on the instructions from the AFCS 240.

Signaling sub system 224 may manage signaling protocol process for MGC 210. For example, signaling sub-system 224 may monitor and control signaling state machines and protocol function handling for various call-setup signaling interfaces to other MGCs and SIP nodes and networks (e.g., PSTN, PLMN). The RSMC 228 may perform call control processes. In an embodiment, the RSMC 228 may be responsible for set-up and tear-down of a call session. The RSMC may control routing of the call to the proper destination and triggering other sub-systems, such as billing sub-system 226. The billing sub-system 224 may provide billing services, process charges associated with call services. In an embodiment, billing sub system 226 may process call charges. For example, the billing sub-system 226 may collect information, such as call data records, and transport the call data records to a business support sub system (BSS) periodically over standard or proprietary interfaces. The other sub-systems 230 may represent other sub systems that may be present in MGC 210. These sub systems may not be used in disclosed processes.

The system 200 may include MGW 250. In an embodiment, MGW 250 may include various sub system for implementing disclosed processes. The calling or the called user may perform some DTMF activity to trigger a false call release event. The DTMF activity is captured by the MGW 250 and reported to the Anti-Fraud Control System Interface 222 through MGI 220. For example, if a call involving the LI target subscriber i.e. as calling or called user, upon receiving a false release trigger from the calling or called user side, after DTMF digits are dialed by calling or called user, the MGC 210 analyzes the possibility of the call being a fraudulent call, i.e., the release trigger received is a false release trigger. Based on the outcome of the analysis, if the MGC 210 concludes that the present call is possibly a fraudulent call, it initiates the media plane audit towards the MGW 250 for the specific call with the potentially fraudulent release event.

Figure 3:
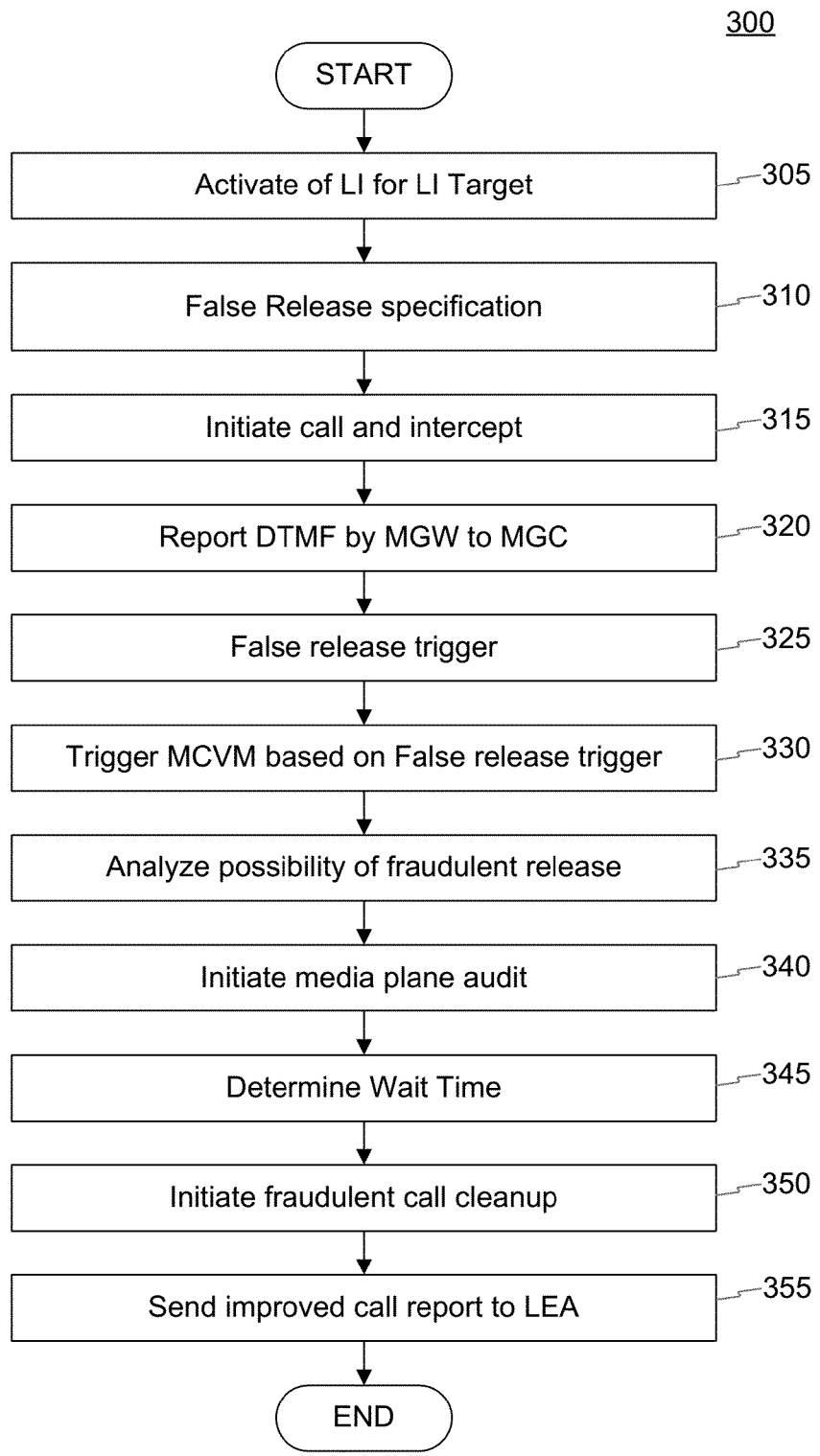
FIG. 3 is a flow diagram illustrating improving lawful interception of a call, in accordance with some embodiments of the present disclosure.

FIG. 3 is a flow diagram illustrating an improved lawful interception of a call in accordance with some embodiments of the present disclosure. Process 300 may be performed using various components of system 100 and system 200. While the process may be described as being performed by specific components, it may be understood that other components may be used to perform the same or equivalent functions.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

The process 300 may begin at step 305. In step 305, LI provisioning system 112 may receive an LI action from LEA administrator 132 using a LEA interface (LEAI). The LI action may include an activation of a LI for a particular subscriber (e.g., a target user). The LI activation may allow interception for all calls involving service provider 110 or MGC 210 until the LI is deactivated. In other embodiments, the LI activation may include an activation period. For example, the LI action may indicate that the LI expires at a particular time.

In step 310, LEA interface (LEAI) specifies what action to take upon reception of a false release trigger. The action could indicate "immediate release" of the media resources (meaning "real termination" of the call) and also the call interception, or release of the media plane resources or to continue the call. In case of specifying that the call should be continued upon a false release trigger, the LEAI also specifies the minimum duration for which the call should be continued. The false release specification information is received by the Provisioning Interface 212, which passes it on to the Configuration Module (CM) 214 in the MGC or softswitch 210.

In step 315, call initiation is performed by the MGC 210. A call involving the LI target is initiated with the LI target being the calling or the called user in the call. Also, the call interception is initiated by the MGC or softswitch 210 i.e. while setting up the call involving the LI target subscriber. Thereafter, the MGC 210 transfers signaling information, and also initiates transfer of media information from the MGW 250 to the LEAI through LIG. The LEA monitors the current state of the call using information received.

Step 320 is the DTMF reporting to the MGC 210, which is performed by the Media Gateway (MGW). The calling or the called user may perform some DTMF activity to trigger a false call release event. The DTMF activity is captured by the MGW 250 and reported to the Anti-Fraud Control System Interface 240 and the Media Connection Verification Module (MCVM) 218 in the MGC 210 through Media Gateway Interface 220. Thereafter, the MGC 210 reports the DTMF activity to the Anti-Fraud Control system 240.

In step 325, the MGC 210 receives a false release trigger based on the DTMF activity by calling or called user. The MGC 210 triggers the MCVM 218 for determining potentially fraudulent call, which is as shown in step 330.

In step 330, for a call involving the LI target subscriber, which is calling or called user, upon receiving a release event, the MCVM 210 in the MGC 210 is triggered by the routing, session management and control sub-system 228 of the MGC 210, before any further actions related to interception (LI) are triggered.

In step 335, determination of potentially fraudulent call is performed by the MGC 210. The MCVM 218 first analyzes the possibility of the call being a fraudulent call, based on the release trigger received which may be a false release trigger. This analysis is based on at least one of the DTMF digits and the DTMF patterns received from the MGW 250, at step 320. The analysis also takes into consideration whether the call is dialed by the user from which side the release trigger was received. Also, the analysis uses the historic trends of calls involving one of the users, always involving DTMF digit exchange before a release trigger. For example, if the DTMF digits were dialed before receiving a release trigger for a call involving an LI target, then the MCVM 218 may conclude that there is a potentially fraudulent call. Also, when the MCVM 218 requests the Anti-Fraud Control System 240 (via the Anti-Fraud Control System Interface 222) the possibility of the release being a false release trigger, further steps taken will be based on the response from the Anti-Fraud Control System 240.

In step 340, if the analysis at the step 335 indicates that there is a potentially fraudulent call, the MCVM 218 initiates a media plane audit on the MGW 250, through the Media Gateway Control Interface 220, for the specific call involving the LI target with the fraudulent release event.

In step 345, if the media plane audit from the MGW 250 indicates that the media path is still active for the fraudulent call involving the LI target, then the MCVM 218 triggers the configuration module (CM) 214 to determine the action to be taken and determine Wait_Time, if applicable. The wait time is determined based on at least one of predefined minimum time duration, predefined maximum time duration, load of one or more telecom interception devices, and congestion of network paths associated with the telecommunication call. The CM 214 in the MGC 210 determines the Wait_Time based on the LEA specification. The CM 214 determines the Wait_Time based on at least one of minimum duration specified by the LEA 130 through the LEAI (T_min), operator-provisioned limit for the maximum duration for a non-billed (but billable) call to continue from the Provisioning Interface module (T_max), system load, congestion levels in the routes to the nodes involved in the call that is continuing beyond the false release. The CM 214 determines the Wait_Time using the inputs, using the following steps, as an example:

If (System Load=normal (i.e., not in overload)
Then
   If Congestion level=normal (i.e., no congestion)
   Then
      Wait_Time_t=Minimum [T_min+(Alpha*Beta*T_min), T_max]
   Else
      Wait_Time_t=Minimum [T_min+(Alpha*Beta*Gamma*T_min), T_max]
   Fi
Else
   If Congestion level=normal (i.e., no congestion)
   Then
      Wait_Time_t=Minimum [T_min+(Alpha*Beta*Epsilon*T_min), T_max]
   Else
      Wait_Time_t=Minimum [T_min+(Alpha*Beta*Gamma*Epsilon*T_min), T_max]
   Fi
Fi
Wait_Time=Maximum [Wait_Time_t, T_min]

In one example embodiment, the parameter value is as below:

Alpha=1, if it is not peak-hour (or) busy-hour
=0.5 otherwise

Also, peak-hour/busy-hour may be provisioned by the operator, as an example 8-10 am, and/or 7-9 pm.

The values of Beta and Gamma may be as below:
Beta is a random value in the range [0.5, 0.9].
Gamma=0.4, if congestion level 1 is exceeded
Gamma=0.1, if congestion level 2 is exceeded.

In one embodiment, congestion level indicates amount of traffic on the routes or paths, to or from the nodes involved in the fraudulent call. The determination of congestion level is implementation dependent, for example, if the messages in the transmission queue are greater than a predefined limit, or if acknowledgement of messages my take longer than a predefined threshold.

Epsilon=0.4, if overload level 1 is exceeded
=0.05 if overload level 2 is exceeded.

In an embodiment, an overload level indicates the load on the MGC or softswitch 210 and/or the MGW 250. The overload level is determined based on at least one of the components such as, but not limited to the MGC 210 and the MGW 250. The overload level in the MGC 210 may be determined based on the parameters such as, but not limited to, factors such as processor (CPU) occupancy thresholds, number of calls actively handled by the softswitch at present, etc. the overload level in the MGW may be determined based on factors such as, but not limited to, processor occupancy thresholds, queue thresholds, and internal delay thresholds. Also, in addition to the above parameters or factors, aspects such as whether the call is in an international call, call involving different networks, whether one of the subscribers involved in the call is a priority subscriber, etc. may be considered, and appropriate factors for the same may be used for calculating the Wait_Time. The Wait_Time calculated by the CM 214 is sent to the MCVM 218.

In step 350, the MGC 210 initiates fraudulent call clean-up. Based on the received "Wait_Time" the MCVM 218 instructs transmission of media information through LEAI to continue or not. In one embodiment, a status update is provided to the LEA 130, as CC_Continue, with update of the actual status of the call, this is done in case the Wait_Time is >0, i.e., the MCVM 218 receives instruction from the CM 214 to continue the telecommunication call and also continue the transmission of media information through LEAI until expiry of the Wait_Time duration. The status of the call may be only media plane is active. Next, upon expiry of the Wait_Time, the MCVM 218 performs one of initiating clearing of one of local resources and state machines within the MGC 210 and clearing of all media plane resources, which is real ending of the call. This is performed by instructing to clear the terminations involved in the call by sending a trigger to the Media Gateway Interface module 220, which in turn instructs the MGW 250.

In one embodiment, the MCVM 218 initiates the termination of the call interception over the LEAI through the LI subsystem 216, which causes the CC_Close to be sent to LEAI and the media path towards LEAI to be terminated. In an example, if Wait_Time=0, then the actions described in step 350 may be performed immediately based on the Audit Reply info received from the MGW that the call is not released on media plane level. Also, in case if the Anti-Fraud Control system instructs the call to be released, which is based on the DTMF info reported in Step 320 before the expiry of "Wait time", the MGC/Softswitch 210 may not release the call until expiry of the "Wait time", and provide appropriate feedback to the Anti-Fraud Control System 240 why it failed to do so. In another embodiment, if the media content which may be one of actual voice and data contents, duplication of the call is performed in a media server (instead of the MGW) and from there it is transported to the LEA, then clearing the media plane resources also include clearing the media server resources for this call.

In step 355, Lawful interception (LI) sub-system 216 sends an improved call report to the Lawful enforcement Agencies (LEA) 130. The MCVM 218 when initiating the instructions to the LI sub-system 216 to terminate the interception also provides an indication of the real reason for release. The real reason may be calling or called user is a fraudulent user. Based on real reason, the LI sub-system 216 includes the information in the CC_Close and sent it to the LEA 130 over the LEAI to indicate the real reason for the call release, which is an enhancement of the standard interface. This also aids the LEA 130 to contact the Anti-Fraud system offline for more info. This step is performed irrespective of whether the Wait_Time=0 or not. If Wait_Time is greater than 0, then the MCVM 218 may indicate to the LI sub-system 216 that the media plane release alone is pending for this call, which causes the LI sub-system 216 to send a CC-Continue record to the LEA 130 through the LEAI to indicate that the call is continuing without the knowledge of the network operator.

Computer System

Figure 4:
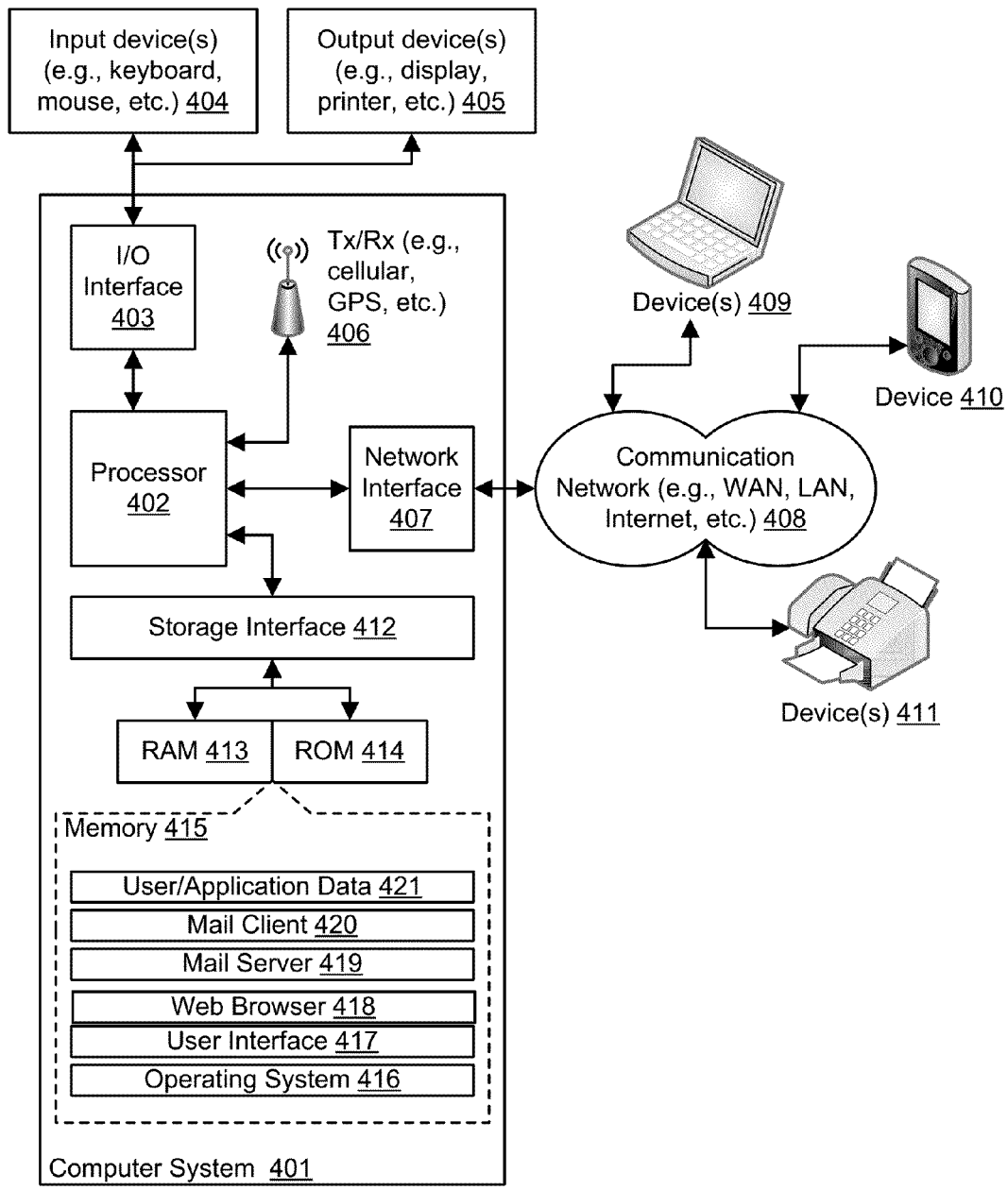
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing LI provisioning system 112 LEA administrator 134, LEMF 136, anti-fraud control system 240, operator input (provisioning) 242, soft switch provisioning system 244, LI gateway 246, MGC 210, and MGW 250. The computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices

410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, LEMF 136, service provider 110, MGC 210, and MGW 240.

The memory devices may store a collection of program or database components, including, without limitation, an operating system 416, user interface 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

In an embodiment, the present disclosure provides enabling uninterrupted, which is improved and more effective, LI even for fraudulent calls after explicit verification of whether media plane resources for the call are still active or not i.e., whether the calling and called users can still communicate or not.

In an embodiment of the present disclosure, when the network receives a false release trigger, it would release all resources as well as the terminate LI prematurely, while the calling and called users continue their communication.

In an embodiment of the present disclosure, for fraudulent calls based on the specification of the LEA, allowing the communication between the calling and called users to continue for a finite duration with LI also continuing without any interruption. This makes the LI more effective, and would aid the LEA in further investigations.

In an embodiment, the present disclosure provides an improved call report to the LEA specifying the actual reason for the call termination and indication that it is a fraudulent call. This would also aid the LEA in further investigations.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | System for improved lawful interceptions of calls |
| 110 | Service Provider |
| 112 | Lawful interception (LI) Provisioning System |
| 114 | Softswitch/Media gateway controller (MGC) |
| 116 | Media Gateway |
| 118 | LI Gateway |
| 121, 122 | X1 interface |
| 123 | X2 interface |
| 124 | X3 interface |
| 125 | HI1 interface |
| 126 | HI2 interface |
| 127 | HI3 interface |
| 130 | Lawful enforcement Agencies (LEA) |
| 132 | LEA Administration Function |
| 134 | LEA Enforcement Monitoring Facility (LEMF) |
| 200 | Media gateway controller (MGC) System |
| 210 | MGC |
| 212 | Provisioning Interface |
| 214 | Configuration Module |
| 216 | LI sub-system |
| 218 | Media Connection Verification Module |
| 220 | Media Gateway Interface |
| 222 | Anti-Fraud Control System interface |
| 224 | Signaling sub-system |
| 226 | Billing sub-system |
| 228 | Routing, Session Management & Control |
| 230 | Other sub-systems |
| 240 | Anti-Fraud Control System |
| 242 | Operator input (provisioning) |
| 244 | Soft switch provisioning system |
| 246 | LI Gateway |
| 250 | Media Gateway (MGW) |
| 401 | Computer System |
| 402 | Processor |
| 403 | I/O Interface |
| 404 | Input device(s) (e.g., keyboard, mouse, etc.) |
| 405 | Output device(s) (e.g., display, printer, etc.) |
| 406 | Tx/Rx (e.g., cellular, GPS, etc.) |
| 407 | Network Interface |
| 408 | Communication Network (e.g. WAN, LAN, Internet, etc.) |
| 409, 410, 411 | Device(s) |
| 412 | Storage Interface |
| 413 | Random Access Memory (RAM) |
| 414 | Read-Only Memory (ROM) |
| 415 | Memory |
| 416 | Operating System |
| 417 | User Interface |

-continued

Referral Numerals:

| Reference Number | Description |
| --- | --- |
| 418 | Web Browser |
| 419 | Mail Server |
| 420 | Mail Client |
| 421 | User/Application Data |

What is claimed is:

1. A lawful interception device comprising:
a memory;
a processor coupled to the memory storing processor executable instructions which when executed by the processor causes the processor to:
monitor a telecommunication call of a lawful interception target subscriber;
detect a call-release trigger associated with the telecommunication call;
initiate a media plane audit of the telecommunication call to determine whether the call-release trigger is a false release trigger, wherein the media plane audit determines whether media plane resources for the telecommunication call is released in response to the call-release trigger; and
perform at least one call handling action in response to determining a false release trigger.

2. The lawful interception device as claimed in claim 1, wherein the call-release trigger is a pattern of Dual-Tone Multi-Frequency (DTMF) signals.

3. The lawful interception device as claimed in claim 2, wherein the DTMF signal pattern is reported to an external law enforcement agency.

4. The lawful interception device as claimed in claim 1, wherein the at least one call handling action comprises at least one of releasing the media plane resources, terminating telecommunication call interception, and continuing the telecommunication call.

5. The lawful interception device as claimed in claim 4, further comprising instructions to calculate a wait time until expiry of which to continue the telecommunication call after determination of the false release trigger.

6. The lawful interception device as claimed in claim 5, wherein the wait time is based on at least one of a predefined minimum time duration, a predefined maximum time duration, load of one or more telecom interception devices, and congestion of network paths associated with the telecommunication call.

7. The lawful interception device as claimed in claim 5, further comprising instructions to terminate the telecommunication call on expiration of the wait time.

8. The lawful interception device as claimed in claim 7, wherein terminating the telecommunication call comprises releasing resources of the telecommunication call and terminating lawful interception (LI).

9. The lawful interception device as claimed in claim 7, further comprising instructions to provide a call termination report to the law enforcement agency, wherein the call termination report comprises an information of real reason for release of resources.

10. The lawful interception device as claimed in claim 5, further comprising providing a status update of the telecommunication call to Lawful enforcement Agencies (LEA), during the continuing of the telecommunication call till the expiry of the wait time.

11. A method for improving lawful interception of a call, comprising:
monitoring, by a lawful interception device, a telecommunication call of a lawful interception target subscriber;
detecting, by the lawful interception device, a call-release trigger associated with the telecommunication call;
initiating, by the lawful interception device, a media plane audit of the telecommunication call to determine whether the call-release trigger is a false release trigger, wherein the media plane audit determines whether media plane resources for the telecommunication call is released in response to the call-release trigger; and
performing, by the lawful interception device, at least one call handling action in response to determining a false release trigger.

12. The method as claimed in claim 11, wherein the call-release trigger is a pattern of Dual-Tone Multi-Frequency (DTMF) signals.

13. The method as claimed in claim 12, wherein the DTMF signal pattern is reported to an external law enforcement agency.

14. The method as claimed in claim 11, wherein the at least one call handling action comprises at least one of releasing the media plane resources, terminating telecommunication call interception, and continuing the telecommunication call.

15. The method as claimed in claim 14, further comprising instructions to calculate a wait time until expiry of which to continue the telecommunication call after determination of the false release trigger.

16. The method as claimed in claim 15, wherein the wait time is based on at least one of a predefined minimum time duration, a predefined maximum time duration, load of one or more telecom interception devices, and congestion of network paths associated with the telecommunication call.

17. The method as claimed in claim 15, further comprising instructions to terminate the telecommunication call on expiration of the wait time.

18. The method as claimed in claim 17, wherein terminating the telecommunication call comprises releasing resources of the telecommunication call and terminating lawful interception (LI).

19. The method as claimed in claim 17, further comprising instructions to provide a call termination report to the law enforcement agency, wherein the call termination report comprises an information of real reason for release of resources.

20. The lawful interception device as claimed in claim 15, further comprising providing a status update of the telecommunication call to Lawful enforcement Agencies (LEA), during the continuing of the telecommunication call till the expiry of the wait time.

21. A non-transitory computer readable medium including instructions stored thereon that when processed by at least one processor cause a system to perform operations comprising:
monitoring a telecommunication call of a lawful interception target subscriber;
detecting a call-release trigger associated with the telecommunication call;
initiating a media plane audit of the telecommunication call to determine whether the call-release trigger is a false release trigger, wherein the media plane audit determines whether media plane resources for the telecommunication call is released in response to the call-release trigger; and
performing at least one call handling action in response to determining a false release trigger.

* * * * *